United States Patent

[11] 3,620,959

| [72] | Inventor | Forrest L. Murdock, Sr. |
| | | 2420 East 24th St., Tulsa, Okla. 74114 |
| [21] | Appl. No. | 31,326 |
| [22] | Filed | Apr. 23, 1970 |
| [45] | Patented | Nov. 16, 1971 |

[54] APPARATUS FOR DESALTING CRUDE
8 Claims, 4 Drawing Figs.

[52] U.S. Cl............................................ 204/302, 204/188
[51] Int. Cl........................................... B03c 5/02
[50] Field of Search........................204/302–308, 188–191

[56] References Cited
UNITED STATES PATENTS

| 3,121,055 | 2/1964 | Carswell............... | 204/302 |
| 3,148,133 | 9/1964 | Turner.................. | 204/306 X |
| 3,255,571 | 7/1966 | Walker et al.......... | 204/308 X |
| 3,347,773 | 10/1967 | Turner................. | 204/302 |
| 3,342,991 | 3/1969 | Sauder et al......... | 204/308 X |
| 3,476,678 | 11/1969 | Murdock, Sr........ | 204/302 X |

Primary Examiner—John H. Mack
Assistant Examiner—Neil A. Kaplan
Attorney—Head & Johnson ABSTRACT: This invention relates to an apparatus for desalting crude. The invention is in the form of an elongated horizontal vessel having semiwall partitions therein dividing the vessel into a mixing chamber, a settling chamber, and includes means of introducing fresh water for mixing with and washing the crude in the mixing chamber, means of subjecting the crude to electric fields in the downflow and final treating chambers to augment the separation water from the crude, and means for separately passing the desalted crude out one outlet opening and water having salt extracted from the crude out another outlet opening.

INVENTOR.
FORREST L. MURDOCK, SR

BY Head & Johnson

ATTORNEYS

INVENTOR.
FORREST L. MURDOCK, SR
BY *Head & Johnson*
ATTORNEYS

APPARATUS FOR DESALTING CRUDE

BACKGROUND AND OBJECTS OF THE INVENTION

In some geographical areas of the United States produced crude oil includes substantial quantities of salt. In some instances the salt content may be so high as to interfere with the subsequent transportation, storage and refining of the crude. Salt in crude is highly deleterious to most metal equipment and piping and for this reason it is highly desirable that the salt, or at least a substantial portion thereof, be removed.

It is therefore an object of this invention to provide an apparatus for treating crude production for removing substantial portions of excess salt content therefrom.

Another, and more specific, object of the invention is to provide a treating apparatus in the form of a horizontal vessel including a series of treating compartments through which the crude flows and in which the crude is subjected to a sequence of treating steps for removing excessive salt content therefrom.

Other objects of the invention will become apparent in the description and claims, taken in conjunction with the attached drawings.

DESCRIPTION OF THE VIEWS

FIG. 1 is a side view of a horizontal treating vessel embodying the principles of this invention, shown partially cutaway to disclose the interior arrangement.

FIGS. 2, 3 and 4 are cross-sectional views taken along the lines 2—2, 3—3, and 4—4 respectively of FIG. 1.

DETAILED DESCRIPTION

Figure 1:
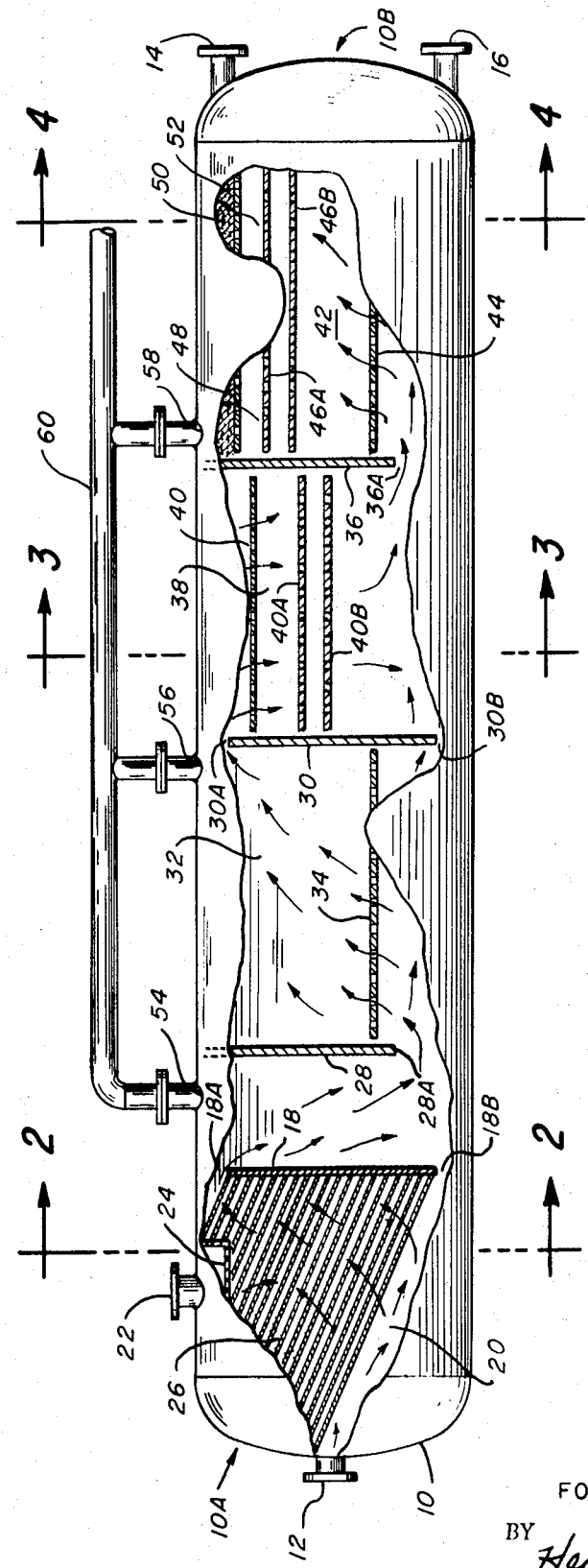
Figure 2:
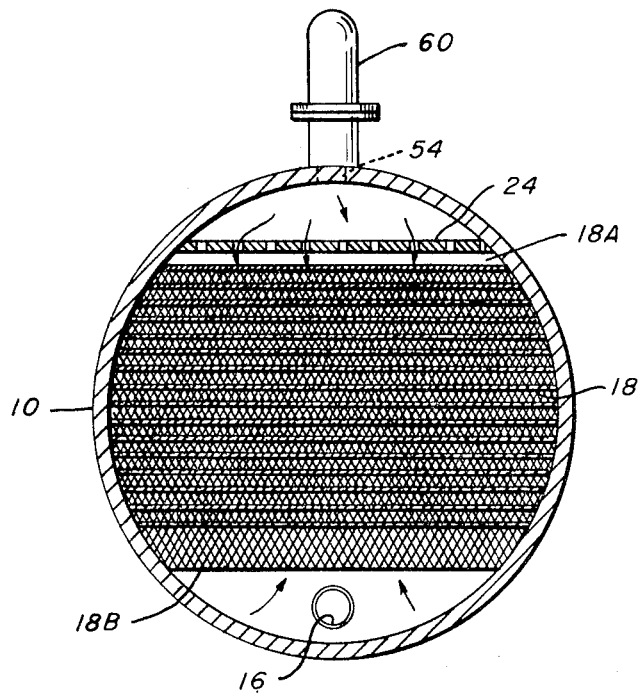

Referring to FIG. 1, a vessel which encompasses the principles of this invention is shown. The vessel 10 is in the form of an elongated horizontal vessel having an inlet end designated as 10A and an outlet end designated as 10B. The inlet end includes a crude oil inlet 12 and the outlet end includes an oil outlet 14 and a water outlet 16. The vessel 10 is divided by semiwalls into chambers in a manner such that crude oil flowing into inlet 12 is subjected to a sequence of treating steps as it passes through the vessel and ultimately out through oil outlet 14.

Spaced from the inlet end 10A is a first semiwall 18. Between inlet end 10A and semiwall 18 there is thereby formed within the vessel a mixing chamber 20. Communicating with the mixing chamber 20 is a wash water inlet 22 by means of which fresh water is introduced into vessel 10. Below the fresh water inlet 22 is a perforated spreader 24 so that water entering inlet 22 is spread out to pass downwardly within the mixing chamber 20. In addition, within the mixing chamber 20 is a plurality of paralleled, spaced-apart, perforated diverter plates 26. Diverter plates 26 may be formed of material such as expanded metal and are inclined downwardly from the inlet end 10A towards the first semiwall 18. For more detailed description of the construction, application and operation of diverter plates 26 reference may be had to my copending application entitled "Improved Separator Vessel Having Multiple Parallel Separator Plates."

Semiwall 18 is of a height less than the interior of the vessel 10 and thereby provides an opening 18A above the semiwall and an opening 18B below the semiwall. Crude, having excess salt content, introduced through inlet 12 is mixed in mixing chamber 20 with fresh water introduced through water inlet 22. The fresh water dissolves the salt content of the crude and, being heavier than crude, tends to settle to the bottom. The crude being lighter than water, and particularly lighter than the water having salt dissolved therein, tends to pass upwardly and over semiwall 18 through opening 18A while water flows through opening 18B below the semiwall 18. The provision of the inclined diverter plates 26 provides for intimate mixing of the fresh water with the crude as the crude and water tend to flow in opposite directions within chamber 20. By the downward inclination of diverter plates 26 water droplets tend to adhere and collect to the plates and pass downwardly towards the bottom of the mixing chamber and through opening 18A.

Spaced from the first semiwall 18 is a second semiwall 28 which closes the vessel at the upper end thereof but does not extend all the way to the bottom of the vessel, providing a lower opening 28A. The height of opening 28A is greater than the height of opening 18B in the first semiwall. Between the first semiwall 18 and second semiwall 28 is formed a flow diverting chamber 29 in which crude flowing over the top of first semiwall 18 is caused to flow downwardly to pass through opening 28A under second semiwall 28. After the crude passes under second semiwall 28 it turns upwardly again, thus undergoing a change of direction tending to divert downwardly heavier components, including water droplets. While the flow of the water components in the lower portion of the vessel is parallel to the flow of the crude components as both components pass under semiwall 28A the rate of flow is not such that any intermixing will occur.

Spaced from second semiwall 28 is a third semiwall 30 providing between the two a quiescent chamber 32. Due to the relatively large volume of quiescent chamber 32 the rate of fluid flow in both vertical and horizontal components is slowed materially so that heavier water contents, such as water droplets, are afforded an opportunity to pass downwardly into the lower portion of the vessel. A horizontal perforated spreader plate 34 in the lower portion of the quiescent chamber 32 serves to evenly spread the flow of crude passing upwardly within the quiescent chamber. Third semiwall 30, like first semiwall 18, provides an upper opening 30A and a lower opening 30B. Fluid flow out of quiescent chamber 32 is such that the lighter crude rises and flows over the third semiwall through opening 30A while the heavier water component having salt dissolved therein flows through the lower opening 30B.

Spaced from third semiwall 30 is a fourth semiwall 36 which extends from the top of the vessel and terminates above the bottom providing a lower opening 36A in the same manner as previously described with reference to second semiwall 28. The lower edge of the fourth semiwall 36 is higher than the lower edge of third semiwall 30. Between third semiwall 30 and fourth semiwall 36 there is formed a downflow treating chamber 38. Extending horizontally across the upper portion of the downflow treating chamber 38 is a perforated spreader 40 which assures an evenly distributed downward flow within the chamber. Supported below the perforated spreader plate 40 in downflow treating chamber 38 are spaced electrical grids 40A and 40B across which an electrical potential is imparted so as to establish an electrical field therebetween. Crude flowing downwardly in treating chamber 38 passes through and between the grids 40A and 40B and thereby is subjected to an electrical field. Such electrical field tends to coalesce water droplets which may be contained in the crude so as to cause the droplets to more readily fall out of the crude and downwardly into the lower portion of the vessel.

Crude passing downwardly in treating chamber 38 flows beneath the fourth semiwall 36 through opening 36A. The horizontal flow of the heavier contents, including water and salt, within the vessel also passes through opening 36A but, as previously mentioned with respect to opening 28A, the rate of flow through the vessel compared to the size of the opening 36A is such that no intermixing tends to occur and the fluid streams pass in horizontal stratified layers through opening 36A.

Between fourth semiwall 36 and outlet end 10B of the vessel there is provided a final treating chamber 42. In the lower portion of final treating chamber 42 is a horizontal perforated spreader plate 44 which serves to spread the fluid flow.

Positioned in the chamber 42 above the spreader plate 44 are spaced-apart horizontal electric grids 46A and 46B which, as previously described with reference to grids 40A and 40B, provide means for imparting an electrical field to which fluid is subjected as it passes upwardly within the final treating chamber 42.

Spaced above the electric grid 46A and 46B is a perforated filter plate 48 which provides thereabove a filter chamber 50 filled with a filter medium 52 such as excelsior or any other type of filter medium customarily utilized in the petroleum and chemical industry. Oil outlet 14 communicates with the filter chamber 50. Thus crude oil flowing upwardly in the final treating chamber 42 flows through and between the electrode 46A and 46B, through the upper spreader plate 48, through filter media 50 and out through oil outlet 14.

Three gas outlet openings are provided in the vessel communicating with each compartment within which gas may accumulate as it is separated from the crude oil flowing into the vessel. That is, a gas outlet 54 removes gas accumulating in the upper portion of the vessel between inlet end 10A and the second semiwall 28; gas opening 56 permits the outward passage of gas accumulating in the upper portion of the vessel between second semiwall 28 and fourth semiwall 36; and gas opening 58 permits the outward passage of gas accumulating in the upper portion of the vessel between fourth semiwall 36 and outlet end 10B. Each of the gas outlet openings 54, 56 and 58 receives a conduit communicating with a main gas collection conduit 60 by which gas separated from the crude is carried away.

OPERATION

Crude produced in an oil field having an excess quantity of salt content is passed into the vessel through crude inlet 12. At the same time fresh wash water is passed through water inlet 22. In the mixing chamber 20 the water and crude is thoroughly mixed. The wash water dissolves and thereby absorbs excess salt content of the crude. The crude being lighter flows upwardly and over the top of first semiwall 18 while the water, being heavier and containing dissolved salt, flows downwardly within the vessel and under the first semiwall 18. Water migrates in the lower portion of the vessel towards the water outlet 16 while the lighter crude migrates toward the oil outlet 14. By the arrangement of the quiescent settling chamber 32, the downflow treating chamber 38 and final filter chamber 42 ample opportunity is given for water, having salt dissolved therein, to settle downwardly within the vessel. The crude oil flowing through outlet 14 is thereby made substantially free of excess salt content.

Figure 3:
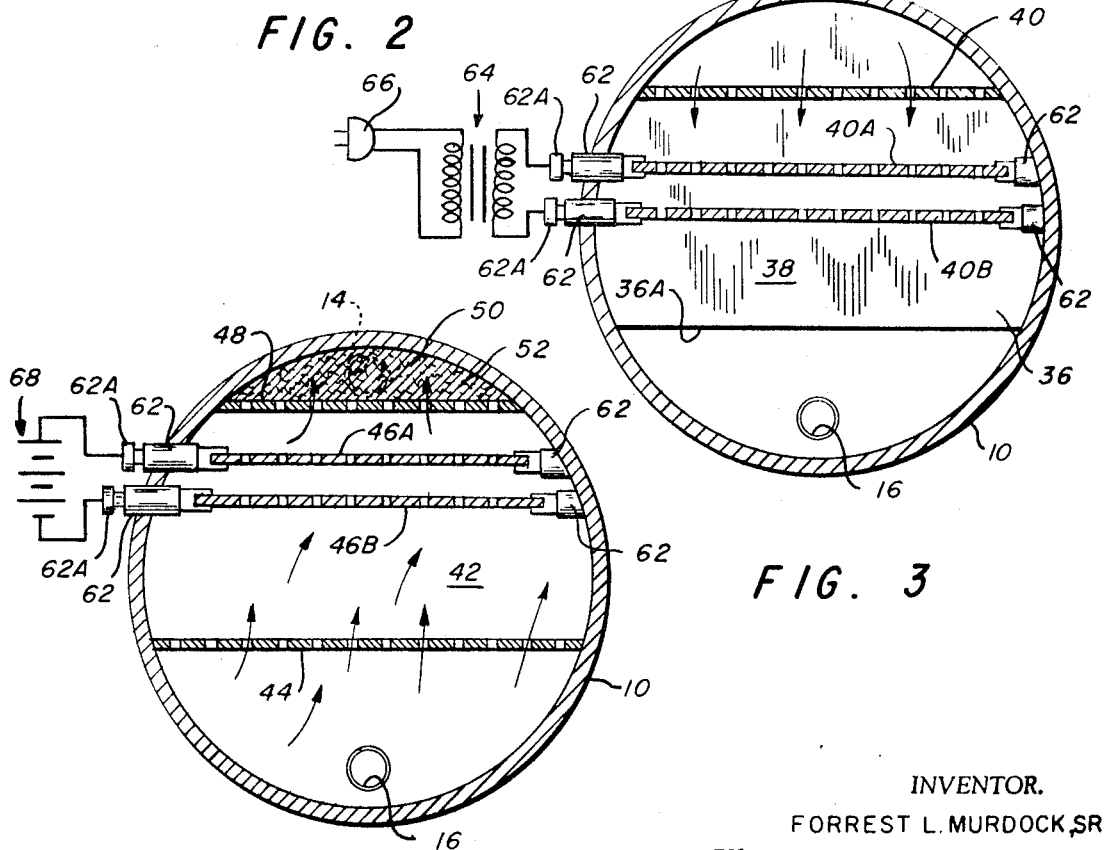
Figure 4:
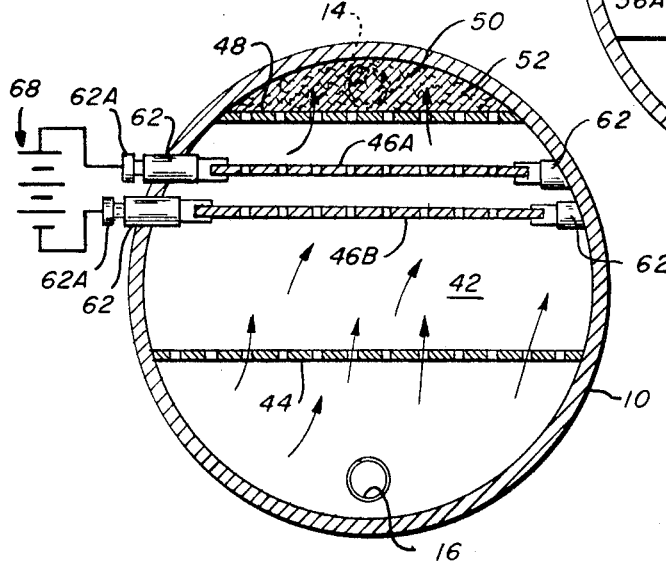

As shown in the cross-sectional views of FIGS. 3 and 4, the perforated electrode plates 40A, 40B, 46A and 46B are supported within the vessels by means of insulators 62. One insulator supporting each plate has a portion 62A extending exteriorly of the vessel by which continuity is provided with the plate exteriorly of the vessel to afford means of imparting an electrical potential to the plates. As shown in FIG. 3 the electrical potential is applied by a transformer 64, the primary of the transformer being connected to an electrical source represented by plug 66. FIG. 4 shows the arrangement wherein a DC potential is applied between the plates represented by a battery 68. In both FIGS. 3 and 4 each plate is shown having means 62A extending externally of the vessel for imparting a charge. It can be seen that in one embodiment one of each of the pairs of plates may be grounded to the vessel so that only one of each pairs of plates needs to have a portion 62A extending exteriorly for imparting a charge, the other charge-carrying conductor being affixed to the vessel. For more information and detailed discussion of the use of the charged plates for treating crude oil emulsions reference may be had to my U.S. Pat. Nos. 3,369,347; 3,371,469; and 3,476,678.

While the invention has been described with a certain degree of particularity, it is manifest that many changes may be made in the details of construction and the arrangement of components without departing from the spirit and scope of this disclosure. It is understood that the invention is not limited to the illustrated embodiment shown and described here for purposes of exemplifying the invention, but the invention is limited only by the scope of the attached claim or claims, including the full range of equivalency to which each element or step thereof is entitled.

What is claimed:

1. An apparatus for desalting crude comprising:
    an elongated horizontal vessel having an inlet end and an outlet end, the vessel having a crude inlet at the inlet end, and an oil outlet and a water outlet at the outlet end, the oil outlet being at a height above the water outlet;
    a first semiwall vertical partition in said vessel spaced from said inlet end and providing an upper passageway over the top of the wall and a lower passageway under the bottom of the wall, the first semiwall and said inlet end providing a mixing chamber therebetween, said vessel having a wash water inlet in the upper portion thereof communicating with said mixing chamber whereby wash water introduced therein mixes with crude in the mixing chamber, the heavier components of fluid flowing past the first semiwall through said lower passageway and the lighter components of fluid flowing past the first semiwall through said upper passageway;
    a second semiwall spaced from the first semiwall providing a flow diversion path therebetween, the second semiwall being closed at the upper end and providing a passageway under the wall, the height of the passageway under the second semiwall being greater than the height of said lower passageway in said first semiwall;
    a third semiwall spaced from said second semiwall providing a quiescent settling chamber therebetween, the third semiwall providing a passageway over the top of the wall and under the bottom of the wall, the heavier fluid components flowing under the third semiwall and the lighter fluid components flowing over the third semiwall;
    a fourth semiwall spaced between said third semiwall and said vessel outlet end providing a downflow treating chamber between the fourth semiwall and said third semiwall and providing a final treating chamber between the fourth semiwall and said vessel outlet end, said oil outlet communicating with the upper portion of said final treating chamber and said water outlet communicating with the lower portion of said final treating chamber, the fourth semiwall providing a flow passageway thereunder, the height of the flow passageway under the fourth semiwall being greater than the height of the flow passageway under said third semiwall; and
    electric grid means supported within said downflow treating chamber, the electric grid means including horizontal spaced apart grids having an electrical field therebetween, the flow of fluid downwardly within said downflow treating chamber being thereby subjected to an electrical field.

2. An apparatus for desalting crude according to claim 1 wherein said vessel has a gas outlet opening communicating with the upper portion of said mixing chamber, said final treating chamber, and one of said quiescent chamber and said downflow treating chamber; and
    gas-collecting conduit means connecting with said gas outlet openings.

3. An apparatus for desalting crude according to claim 1 including:
    a plurality of paralleled, spaced-apart, perforated diverter plates supported within said mixing chamber, the diverter plates being inclined at a downward angle from said inlet end toward said first semiwall.

4. An apparatus for desalting crude according to claim 1 including:
    a horizontal perforated spreader plate supported within the lower portion of said quiescent chamber above the passageway under said first semiwall.

5. An apparatus for desalting crude according to claim 1 including:
    electric grid means supported within said final treating chamber, the electric grid means including horizontal spaced-apart grids having an electric field therebetween, the flow of fluid upwardly in said final treating chamber being thereby subjected to an electric field.

6. An apparatus for desalting crude according to claim 1 including:
a horizontal perforated spreader plate supported within the upper portion of said downflow treating chamber above said electric grid means and below said fluid passageway over the top of said third semiwall.

7. An apparatus for desalting crude according to claim 1 including:
a horizontal perforated spreader plate supported within the lower portion of said final treating chamber and above the fluid passageway under said fourth semiwall.

8. An apparatus for desalting crude according to claim 1 including:
a horizontal perforated spreader plate in the upper portion of said final treating chamber between said fourth semiwall and said vessel outlet end, the perforated spreader providing a filter chamber in the upper portion of the final treating chamber, said oil outlet communicating with said filter chamber; and
filter means within said filter chamber.

* * * * *